INVENTOR.
LUTHER STEPHENSON

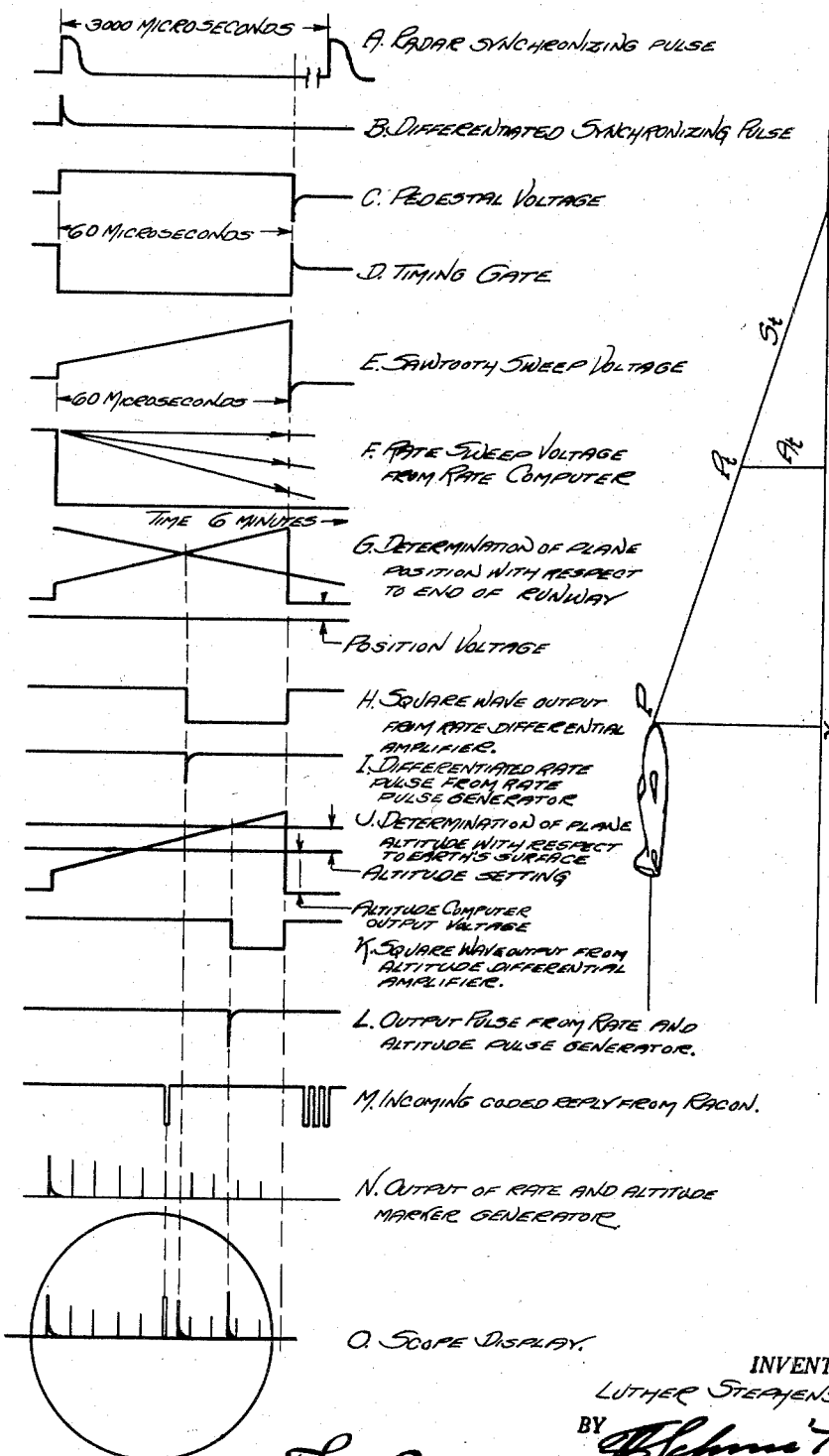

United States Patent Office 2,871,470
Patented Jan. 27, 1959

2,871,470

DEVELOPMENT OF AN AIR CONTROLLED APPROACH RADAR LANDING SYSTEM

Luther Stephenson, Arlington, Mass.

Application August 19, 1953, Serial No. 375,309

9 Claims. (Cl. 343—11)

(Granted under Title 35, U. S. Code (1952), sec. 266)

The invention described herein may be manufactured by or for the Government of the United States of America for governmental purposes without the payment of any royalties thereon or therefor.

This invention relates to the art of aircraft navigation, especially to that phase of navigation dealing with landing with the aid of instruments and more particularly to an airborne controlled approach radar landing system.

Aircraft must sometimes be landed when adverse weather conditions or darkness have reduced visibility to the point where a visual landing approach would be extremely hazardous or even impossible. Under these circumstances, the pilot must be guided to a specified contact point on the runway with the aid of radio and/or radar equipment. Many of the larger airports are presently equipped with ground equipment for establishing contact with an incoming aircraft and providing information by which the aircraft may be guided to safe contact with the runway.

One type of equipment is the ground controlled approach radar system. This system, although very reliable, has the disadvantages of requiring heavy and expensive equipment and a relatively large ground crew of five men. In this system, an approach controller on the ground gives maneuvering and landing instructions to the pilot of the aircraft through a voice radio link.

Another instrument landing aid is the instrument landing system. In this system terminal radio equipment located near the runway provides a localizer beam and glideslope path which can be utilized by a human pilot or automatic pilot to effect an instrument controlled approach. Here again, heavy and expensive ground equipment is necessary, and a minimum of four instruments must be constantly monitored by the pilot in making an instrument landing approach, thus rendering the landing operation highly complex as regards the pilot.

Because of the high cost of the necessary equipment and the relatively high manpower requirement in the case of the ground controlled approach system, many of the overseas airstrips and smaller domestic airports are unable to provide these landing aids. Consequently, there are many airports where a pilot cannot be provided with accurate position information on glide path for a safe instrument landing approach.

This invention avoids the disadvantages of the prior art by utilizing equipment which is already carried in most military planes and is rapidly becoming standard in commercial aircraft. It eliminates the necessity of complex, expensive ground equipment by employing a light, relatively simple, inexpensive ground unit; dispenses with the need for ground operators, and does not require a communication link with the ground. It presents all the landing information required by the pilot at a single point on the instrument panel. This simplicity of presentation enables the pilot to devote more attention to the operation of aircraft controls, and to maintaining proper aircraft attitude on the approach.

In order to make a safe instrument landing approach, the pilot should have a continuous, complete automatic solution of the glide path triangle landing problem shown in Figure 6 as well as azimuth and attitude information. All of this information is furnished by this invention. At any instant on glide path, the pilot should have an accurate determination of slant range $S_t$ to the end Q of the duty runway, an accurate presentation of altitude $A_t$ above the earth's surface, and a means of observing visually the rate of change of these variables $dS_t$ and $dA_t$ in order that he may control the position of the aircraft at all times on glidepath. This data can be indicated on a radar scope by video pulses representing the respective variables in their proper time relation with respect to calibration markers also presented on the radar screen. Azimuth and slant range data are furnished by radar beacon or racon pulses presented on the same radar screen. By superimposing attitude information from a standard instrument on the radar scope, or presenting it immediately adjacent thereto, all the required indications for the landing approach can be made available at a single point for greatest convenience and utility.

In order to provide all the above information to the pilot, it was necessary to design an electronic amplifier for the purpose of translating the output of an electronic altimeter into the form of an altitude pulse useable for presentation on the radar screen. A novel altitude differential amplifier was required to convert the output of the altitude computer amplifier into time-demodulated altitude voltage pulses which could be presented on the radar indicator. It was also necessary to device a means of calibrating the radar indicator presentation so that range markers derived from the radar range unit could be used to indicate aircraft altitude in feet, as well as slant range in nautical miles to the touchdown point and to devise an electronic closing rate computer which would provide a rate pulse for preesntation on the indicator. This rate pulse may be used in conjunction with the racon pulse to enable the pilot to maintain any desired ground speed on glidepath, regardless of windage encountered.

It is an object of this invention to provide an airborne conrtolled radar approach landing system, which will enable a pilot to make an instrument approach without the aid of a ground crew or of extensive terminal equipment.

It is another object of the invention to provide such a system utilizing ground equipment that is inexpensive and relatively easy to manufacture and which can be easily installed at any terminal, including small overseas airstrips. It is another object of this invention to employ a minimum of ground equipment and to use equipment which does not require ground operators for the approach operation.

To further utilize equipment already carried in most military aircraft and in many commercial planes is also an object of this invention.

A further object of this invention is to provide equipment which will utilize the triggered response from radar beacon (racon) terminal equipment to provide azimuth information, as well as slant range and closing rate data for use in aircraft landing operations.

It is also an object of the invention to teach new means for converting the signal output of the altitude computer of an electronic altimeter into a useable form for input to a radar indicator.

It is a further object of this invention to provide altitude, range, and closing rate information from automatic electronic computers in a useable form for presentation on a radar indicator.

Another object of the invention is to show means for comparing a preselected desired closing rate with the actual closing rate of a landing aircraft, so that a pilot may fly at any desired ground speed on glide path, regardless of wind conditions, and without visual reference to an airspeed indicator.

An additional object of the present invention is to devise a system of calibration whereby radar range markers may also be employed to determine altitude on glide path.

Still another object lies in presenting all the information required for an instrument landing approach directly to the pilot at a single point on the instrument panel of the aircraft.

Other objects and many of the attendant advantages of this invention will be readily appreciated as the same becomes better understood by reference to the following detailed description when considered in connection with the accompanying drawings wherein:

Figure 3 shows the waveform patterns appearing at various points in the system and illustrating the time relationships existing between certain circuit functions of the system;

Figure 4 represents the actual airborne radar indicator presentation;

Figure 5 illustrates the presentation on a B type indicator from which azimuth information may be obtained; and Figure 6 shows the glide path triangle which must be solved in making a landing approach.

General operation of the system

Figure 1:
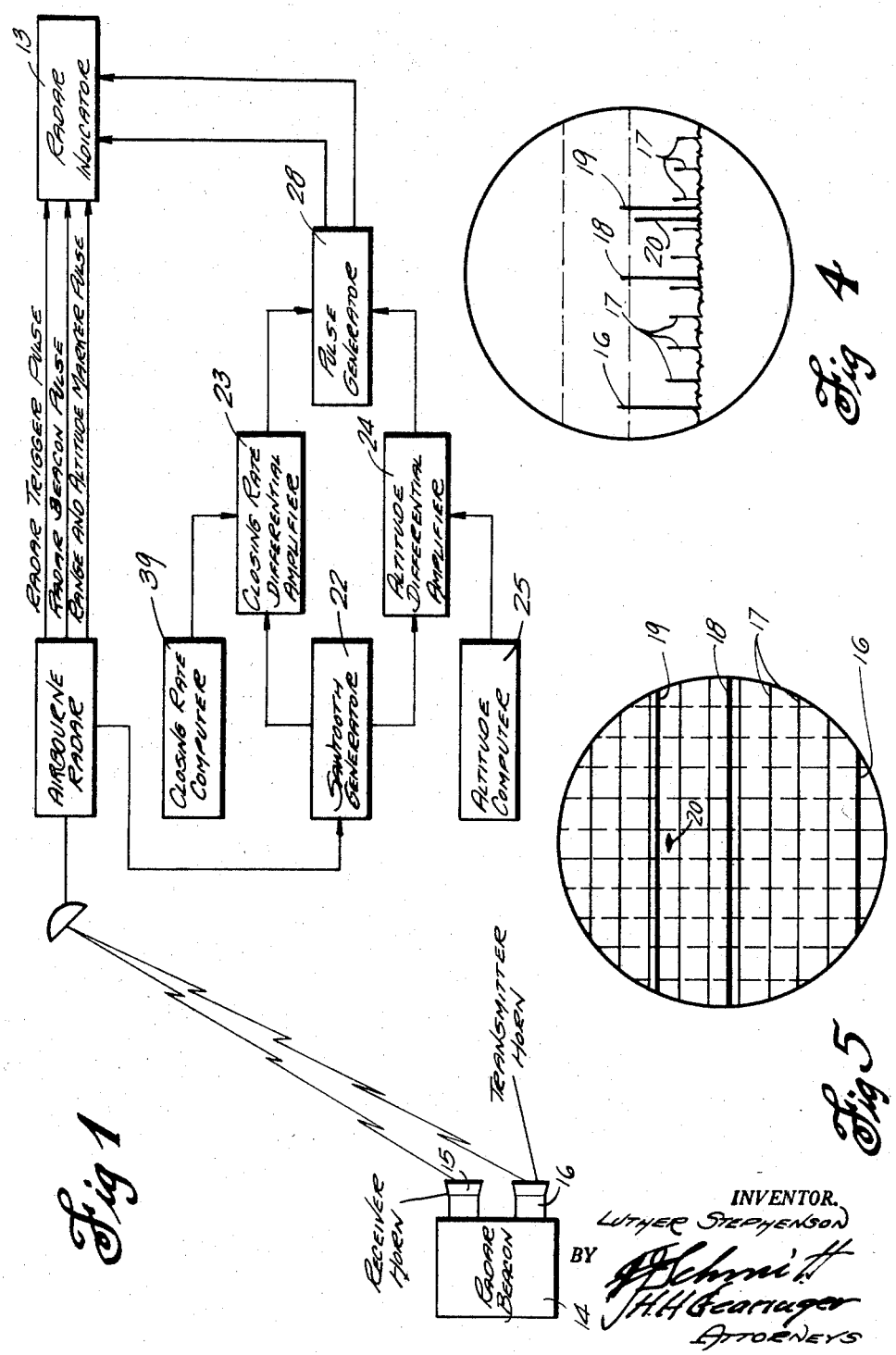
Figure 1 is a block diagram of the radar landing approach system which is the subject of this invention.

The airborne radar equipment which this system is adapted to use can be set for radar beacon or racon operation, for search operation or for both racon and search operation simultaneously. Prior to commencing an approach the airborne radar should be set for beacon operation rather than search operation to avoid the appearance of excessive ground clutter which may obscure the racon response. Near the end of the approach, the radar may be switched to simultaneous search and beacon operation to provide a display of the duty runway as a supplement to azimuth information furnished by the racon equipment.

A normal cycle of operation of the system is begun by a transmitter pulse from the airborne radar which is set to beacon operation. In this setting the transmitter pulse frequency is 350 pulses per second with a pulse duration of about 2 microseconds, so that the transmitter rests approximately 3,000 microseconds between pulses. The transmitter pulse is differentiated and employed to trigger a 60 microsecond pedestal or gate generator to initiate the radar indicator trace and to set into operation a rate and altitude marker generator which will hereinafter be more fully explained. The pedestal voltage is fed to a 60 microsecond sweep generator which produces a linearly rising voltage and this sweep voltage is fed simultaneously to the control grids of a rate differential amplifier and an altitude differential amplifier which are normally held in cutoff condition by excessive bias voltage. When the aircraft starts on glidepath, a step input voltage is applied to the control grid of an inverse feedback RC integrator the output of which is a linearly decreasing positive voltage. This closing rate voltage is applied as cathode bias to the closing rate differential amplifier whose grid voltage is increasing steadily by virtue of the 60 microsecond sawtooth voltage applied thereto. Therefore, at some time after the initiating radar pulse, the bias voltage on the rate differential amplifier will reach a value less than that required for cutoff and the rate differential amplifier will begin to conduct, providing a negative square wave which is inverted, differentiated and applied to the radar indicator as a positive pulse which moves toward zero range on each successive trace as the closing rate biasing voltage on the differential amplifier decreases with time. The altitude computer imposes a negative voltage proportional to altitude on the grid of the altitude differential amplifier and when this negative biasing voltage is overcome by the positive sawtooth voltage which is applied to the same grid the altitude differential amplifier will conduct providing a negative square wave which is inverted and differentiated and also appears on the radar scope as a sliding pulse which recedes toward zero altitude as the aircraft descends on glidepath.

The transmitted radar pulse also triggers the radar beacon transmitter or transponder located at the end of the duty runway, and the beacon response appears on the radar screen at a time delayed from the initial triggering pulse by a period proportional to the slant range distance between the aircraft and the beacon. Range markers are provided on the radar screen, and to simplify the presentation, the altitude computer amplifier is calibrated so that the range markers also serve as altitude markers. Range markers are a series of damped oscillations produced in an LC tank circuit in the radar range unit when current flow through the tank is suddenly cut off by the synchronizing radar pulse. The sine wave output of the LC circuit is clipped and peaked into narrow pulses which appear on the radar indicator as range markers.

A schematic representation of a complete radar scope display appears in Line O of Figure 3.

Airborne radar and radar ground equipment

Figure 2:
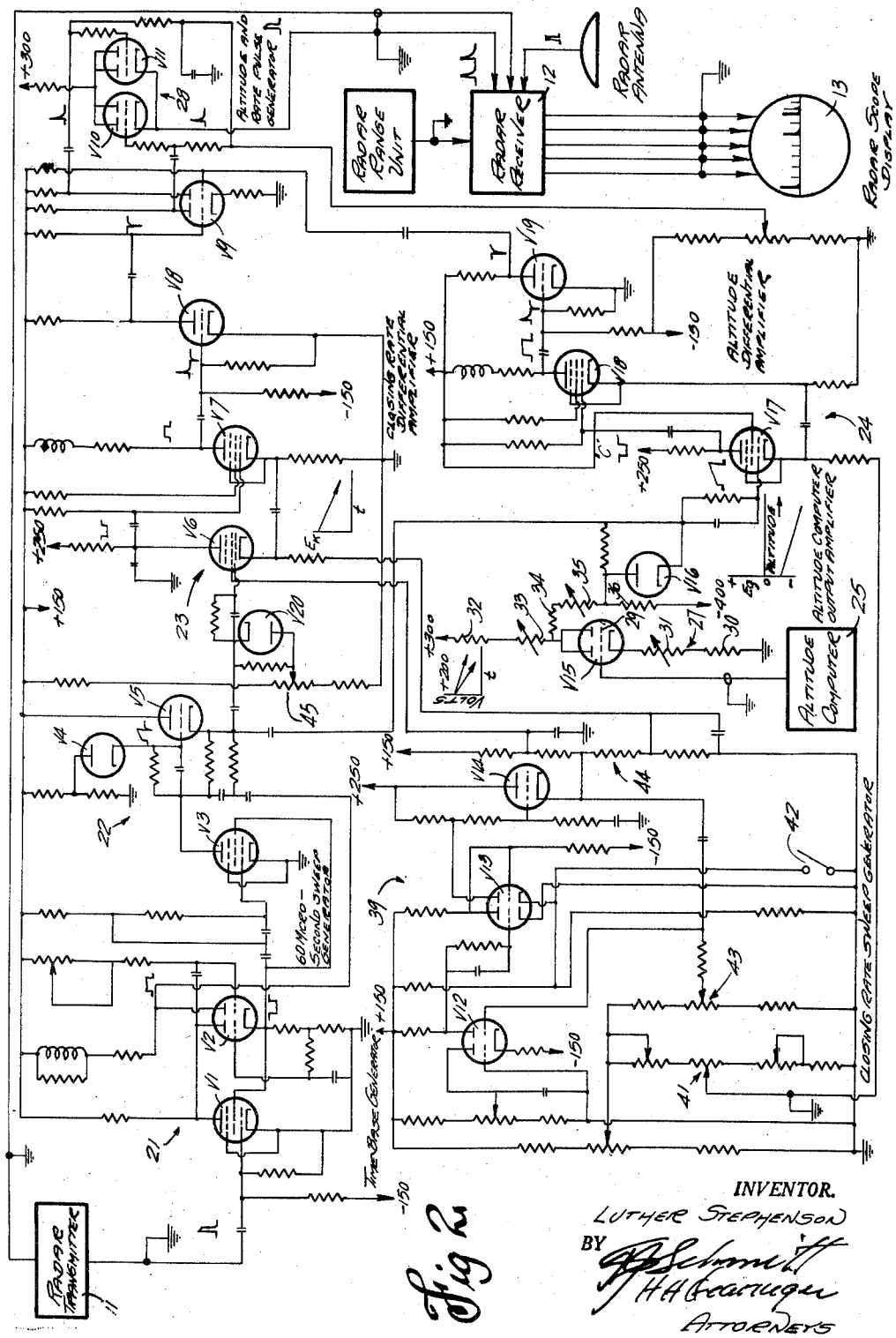
Figure 2 is a schematic circuit diagram of the system in which certain portions are shown in block form.

The airborne radar, including a transmitter 11 (see Fig. 2) receiver 12 (see Fig. 2), radar indicator 13 (see Figs. 1 and 2), and the radar beacon or racon equipment 14 (see Fig. 1) on the ground comprising a transmitter and a receiver are standard equipment not claimed by this inventor but which comprise an integral part of the novel system. Since this equipment is well known in the art a detailed explanation will not be made but the general sequence of its functions will be outlined to provide a complete overall picture of the landing system.

The airborne radar which this system is designed to employ may be selectively set for search or beacon operation. In beacon operation transmitted pulses of approximately 2 microseconds' duration are emitted at a rate of 350 pulses per second. These pulses are received by a relatively low-gain crystal receiver in the ground beacon through a highly directional, narrow horn type receiver antenna 15. The received signal is fed to a coder which generates transmitter trigger pulses according to a preselected code. The coded pulses are used to key a magnetron oscillator in the transmitter section of the beacon. The keyed magnetron pulses are emitted from the horn type antenna 16. The racon transmitter may be considered as a low-power type with peak power of less than one kilowatt. The highly directional characteristics of the narrow horn antennas of both the receiver and transmitter sections of the beacon prevent response to interrogating pulses from the airborne radar except when the pulses are in direct alignment with the runway. Therefore, to obtain correct azimuth information the aircraft attempting to land is circled over the field with its radar on beacon operation until there is a response from the ground beacon. Then by noting aircraft heading and antenna position the pilot may determine location of the runway and maintain correct heading for glidepath. The transmitted racon pulses are of approximately 0.5 microsecond duration and the transmitter circuitry controlling its operating cycles is such that the racon can properly respond to about three searchlighting interrogating radars or about sixty scanning radars simultaneously. It is considered improbable that more than three aircraft would ever be triggering the directional racon during normal landing operations.

The airborne radar receiver is a conventional, high-gain receiver which provides video signals to the radar indicator. The beacon pulses pass through the radar receiver and appear on the radar indicator as positive video pips which move toward zero range as the aircraft closes on the runway.

*Time base generator and sawtooth sweep generator*

At each airborne radar transmitter pulse, a synchronizing pulse of approximately 20 to 30 volts in amplitude is used to trigger a time base generator 21 (see Fig. 2) which includes a trigger tube V1 and a one-shot multivibrator composed of the two halves of V2 and the necessary circuit elements to produce a timing gate of the desired duration. In this instance a timing gate voltage D of Figure 3 of 60 microseconds duration is created. This gate is applied to a sawtooth sweep generator 22 comprising tubes V3, V4 and V5 and associated circuit elements which produces the linearly rising sweep voltage shown at E in Figure 3. This sweep voltage is applied simultaneously to the control grids of the rate and altitude differential amplifiers 23 and 24 respectively.

*The altitude computer circuits*

A conventional airborne radio altimeter 25 is used as the altitude computer for this system. This altimeter operates by transmitting a frequency modulated carrier signal toward the ground and receiving an echo. The received frequency is compared with the frequency being transmitted at that instant to produce an audio "beat" frequency, which is proportional to the altitude of the aircraft above the ground. The altimeter produces a cathode follower output which appears as a linear direct current voltage which varies with changes of altitude. On glidepath, a slowly decreasing positive direct current output voltage would be produced, which is directly proportional to the altitude of the aircraft above the earth's surface.

In order to transform this output to a form suitable for display on a radar scope, it is necessary to convert the altimeter output into a negative biasing voltage which is used to produce a time-demodulated altitude voltage pulse on the radar indicator. To accomplish this task, a low gain amplifier 27 including tube V15 was designed to invert the signal and change the direct current voltage level from a positive to a negative value so that it could be employed as a negative biasing voltage for the altitude differential amplifier grid. The output of the altitude differential amplifier is a negative square wave at the plate of V17, the leading edge of which is delayed from the initiation of the timing gate by a period of time proportional to the aircraft altitude. The square wave pulse produced by the differential amplifier is inverted, differentiated and amplified in the circuits including V18, V19 and one-half of V9 and is then fed to V11 in a pulse generator 28 which produces a positive altitude pulse that is imposed on the radar indicator.

The altitude computer amplifier 27, comprises a cathode degenerative high mu twin-triode V15 connected for operation as a single triode having its grid 29 connected to the cathode output of the altitude computer 25, and its cathode connected to ground through cathode resistor 30 and variable resistor 31. The plate circuit of the amplifier includes resistor 32 connected in series with variable resistor 33 to a positive direct current voltage source. These resistors are also part of a voltage divider network, including resistors 34, 35 and 36. The network terminates at a negative voltage so that the output signal, taken between resistor 36 and variable resistor 35 is at a negative direct current level. Cathode degeneration insures low gain, as required, and protects against variation in output linearity caused by changes in vacuum tube characteristics. Inversion of the signal is accomplished by taking the output from the plate circuit. The variable resistances 31, 33, and 35 are provided for calibration purposes so that the radar range markers may also be used as altitude markers, and also to vary the gain of the amplifier. Cathode resistance for V15 must be high enough to prevent loading of the altitude counter circuit under all conditions of operation during a landing operation.

Altitude amplifier output voltage, a gradually diminishing negative voltage on glidepath, is applied to the grid of the altitude differential amplifier V17 along with the linearly rising 60 microsecond sweep pulses which are applied through the coupling capacitor 40. A positive biasing voltage taken from a regulated voltage network 41 and applied to the cathode of V17 adds to the biasing effect of the altitude computer amplifier output voltage as a calibration voltage to keep the differential amplifier grid below cutoff until the 60 microsecond sweep voltage rises high enough to overcome the negative bias and permit the tube to conduct at the proper time. V17 continues to conduct for the remainder of the 60 microsecond sweep, producing a negative square wave at its plate. The square wave is inverted, differentiated and fed to a pulse generator 28 which produces a positive pulse which appears on the radar indicator as the altitude video pulse 18. Since the altitude amplifier output voltage decreases linearly in magnitude as the aircraft descends on glidepath, the grid bias is diminished and the 60 microsecond sweep voltage will trigger the differential amplifier a few microseconds sooner on each successive sweep. This causes the altitude pip on the radar indicator to move slowly toward zero altitude indication as the aircraft altitude diminishes on glidepath.

*The closing rate computer circuits*

During the landing operation, it is desirable to provide the pilot with closing rate information as part of the glide path solution without the necessity of his referring to an airspeed indicator. To do this, a closing rate computer is employed to control the position of a video pip which moves across the radar screen at a rate representing the optimum closing rate for the particular aircraft so that it can be continuously compared with the actual closing rate which is represented by the movement of the racon video pulse. This arrangement allows the pilot to maintain a desired ground speed on glide path independently of windage effects.

The closing rate computer utilizes an inverse feedback RC integrator 39 which includes vacuum tubes V12, V13 and V14 to provide a linearly decreasing positive voltage that is applied as cathode bias to V6 in a closing rate differential amplifier 23 which is normally biased beyond cutoff. The 60 microsecond sweep voltage is applied to the control grid of V6 and some time after the beginning of a particular radar cycle, the combination of rising grid voltage and decreasing cathode voltage will permit the closing rate differential amplifier to conduct, producing a negative square wave plate output voltage. The leading edge of this square wave represents the closing rate and, because of the continuously decreasing cathode bias voltage from the RC integrator, will occur an instant sooner on each successive radar cycle. The leading edge of the closing rate differential amplifier plate output is used to trigger V10 in the rate pulse generator 28 which controls the appearance of the closing rate video pulse 19 on the radar screen.

It can be shown mathematically that the output voltage, $e_o$, of an inverse feedback RC integrator circuit such as that employed here is expressed as a function of time by the equation $$e_o = -G\left[1 - \epsilon^{\frac{-t}{RC(G+1)}}\right]e_i$$

where G is the gain of the amplifier used in the integrating circuit and $e_i$ is the input signal voltage. This voltage approaches a maximum value of $-Ge_i$ with a time constant of $(G+1)RC$ whereas in a simple RC circuit $e_o$ approaches $e_i$ with a time constant RC. The above equation may be expressed as a power series in terms of time in the form $$e_o = \frac{-G}{RC(G+1)}\left[ t - \frac{t^2}{2RC(G+1)} + \cdots \right] e_i$$

This equation shows that $e_o$ for a positive step voltage input will be a voltage decreasing linearly with time and that, because of the relative values of R, C, G and $t$, the departure from linearity will be negligible for a period of six minutes or more, which will normally be adequate for the landing operation.

The closing rate differential amplifier V6 has its cathode and screen grid tied to fixed points on the voltage divider resistance network 44. With switch 42 open, there is a large cathode bias applied to the right half of V13 and the output of the rate sweep generator is a constant voltage across the network 44. When the aircraft begins its descent on glidepath, the switch 42 is closed, setting the closing rate sweep generator into operation. Now the output of the rate sweep generator becomes a gradually decreasing positive voltage which appears at the cathode of the cathode follower V14 and is applied to the cathode of V6 as a linearly decreasing cathode bias. The control grid of V6 is connected to position control potentiometer 45 and has impressed upon it the 60 microsecond sweep voltage. The closing rate differential amplifier is held in cut off condition by the cathode bias until the 60 microsecond sweep voltage raises the control grid potential above the cutoff point. On each successive sweep this occurs a few microseconds sooner due to the decreasing closing rate voltage being applied to the cathode of V6. When V6 conducts, a negative square wave is produced in the plate circuit. This square wave is inverted, differentiated and amplified as it passes through V7 and V8 and is fed to the grid of the first triode section of V9 whose output is used to trigger the rate pulse generator V10. Because the pulse generator fires earlier on each sweep, the closing rate pulse appears on the radar indicator as a positive video pulse moving toward zero range at a rate indicating the optimum closing rate for the particular aircraft. The variable resistances in the networks 41 and 43 and the manual position adjustment 45 are pre-flight calibrated to obtain the desired closing rate and starting position for the rate pip. In operation of the system the position voltage is adjusted so that with switch 42 open the closing rate differential amplifier fires at a time which produces a rate pip at the range at which the craft will push over on glidepath. When the craft starts on glidepath, switch 42 is closed and the pilot controls the speed of the aircraft so that the actual closing rate coincides with the indicated optimum closing rate. This occurs when the racon pulse 20 on the screen is continuously bracketed by the closing rate pip 19 triggered by the rate differential amplifier.

By tapping both the cathode and screen grid of V6 into the same resistor network, the screen grid to cathode potential is kept constant during operation so that the closing rate differential amplifier will start to conduct at the same control grid to cathode voltage regardless of changes in the plate voltage of V6 which varies under operating conditions. In this manner a more accurate closing rate is obtainable.

Clipper diodes V20 and V16 in the control grid circuits of the rate and altitude differential amplifiers respectively, prevent the grid capacitors from acquiring a negative charge from the recurring 60 microsecond sweep voltage and also act to clip the negative overshoot or horn from the trailing edge of the 60 microsecond sweep voltage.

*System analysis*

Looking now at the waveform diagrams of Figure 3, the operation of the system may be analyzed as follows:

At intervals of approximately 3000 microseconds, a radar synchronizing pulse shown in Figure 3A is provided by the airborne radar transmitter. This pulse is approximately 20 to 30 volts magnitude and about 2 microseconds duration. The synchronizing pulse of Figure 3B, after being differentiated, is used to trigger the time base generator which produces the 60 microsecond pedestal voltage shown in Figure 3C and the timing gate voltage, Figure 3D. The synchronizing pulse also starts the radar indicator sweep and marker generator. With a 60 microsecond timing gate the radar screen represents a range of slightly less than 5 nautical miles. The timing gate and pedestal voltage are applied to the sawtooth sweep generator to produce the sawtooth sweep voltage seen at Figure 3E.

When the aircraft starts on glidepath, the pilot closes switch 42 causing operation of the closing rate computer which generates the rate sweep voltage of Figure 3F. The slope of the rate sweep voltage depends upon the desired optimum closing rate and may be varied by adjustment of the input voltages to the rate sweep generator. The grid bias on the closing rate differential amplifier is adjusted by changing the voltage tap at the position potentiometer 45. The positive going 60 microsecond sweep voltage is added to the control grid while the decreasing closing rate sweep voltage is applied as cathode bias on the closing rate differential amplifier so that at some time after initiation of the cycle the rate differential amplifier enters the conducting zone as shown in Figure 3G and produces a negative square wave pulse seen in Figure 3H which is differentiated and used to trigger the rate pulse generator. A rate pulse shown in Figure 3I occurs at a time coincident with the leading edge of the square wave pulse and appears on the radar screen as the closing rate video pip. The altitude differential amplifier has impressed on its control grid a negative direct current voltage representing altitude and superimposed thereon, the positive going 60 microsecond sweep voltage. The cathode of the altitude differential amplifier is tapped into a positive biasing voltage so that the tube is normally held in cutoff condition. However, as the 60 microsecond sweep voltage continues to rise, it reaches a point at which the altitude differential amplifier will begin to conduct as seen in Figure 3J and will produce a negative square wave pulse shown in Figure 3K which is used to trigger the altitude pulse generator at a time coinciding with the occurrence of the leading edge of the negative square wave pulse. The altitude pulse generator produces the altitude pulse of Figure 3L which appears on the radar screen as the altitude video pip. Figure 3M shows the received radar beacon response triggered by the interrogating airborne radar. The racon response is delayed by a time corresponding to the actual range of the aircraft from the end of the runway. In the illustration, the radar beacon response is a 1–3 coded signal, only one pulse of which appears on the 4 mile range setting of the radar indicator. Figure 3N is a representation of the output of the range and altitude marker generator and Figure 3O shows the radar indicator presentation which would result with the timing relations occurring in Figures 3A to 3N.

*Range and altitude marker circuits*

In order to permit quick, accurate reading of instantaneous range and altitude, calibration markers are provided on the radar scope for comparison with the received video and differential amplifier pulses. These markers are produced by oscillating current in an LC resonant circuit in the cathode of a normally conducting stage. The tube is cut off by a negative gate applied to the grid and the current trapped in the resonant circuit begins to oscillate and produce a series of sine waves of gradually decreasing magnitude during the time the tube remains cut off. The time duration of each cycle, considering optimum conditions of negligible resistance in the resonant circuit, will be equal to $2\pi\sqrt{LC}$ seconds. Appropriate circuit constants can be chosen to produce a cycle duration of 6.1 microseconds which corresponds to a range of ½ nautical mile. During a 60 microsecond gate as used in this system there will be produced nine marker oscillations which are formed into narrow pulses by clipping and peaking circuits and fed to the radar indicator where they appear as narrow positive pips 17 along with the range, rate and altitude video pulses. Alternate circuit constants can be switched in to produce various intervals between marker oscillations.

Since these markers are also to be used as altitude markers it is necessary to calibrate the altitude computer amplifier so that its output will be a voltage of sufficient amplitude to cause a delay in the appearance of the altitude pulse equal to the time duration of each cycle of the sine wave produced in the marker generator for every 500 feet of altitude on high range or every 50 feet of altitude on low range.

Assuming the altimeter to be on low range, the scope indication in Figure 4 shows the radar pulse 16 and indicates by means of the radar beacon pulse 20 that the aircraft is at an actual range of 3⅛ miles. The closing rate pulse 19 lags the radar beacon pulse slightly as is the case when actual closing rate exceeds the desired closing rate. The pulse 18 shows the instantaneous altitude of the aircraft.

It was suggested previously that a complete representation of landing data could be furnished at a single point if aircraft attitude indication from a standard instrument were superimposed on the radar scope along with range, closing rate and altitude information.

It is to be pointed out that this system is not intended to furnish flare out information for an automatic pilot to accomplish touch-down on the runway, the assumption being that the aircraft will be under the control of a human pilot who can establish visual contact with the runway at an altitude of 25 to 50 feet. However, with slight modifications to enable the system to produce signals suitable for input to an automatic pilot, the disclosed system can be used to bring an aircraft down to the flare-out point with automatic pilot control.

After the aircraft is at a relatively low altitude on glidepath the system can be made more effective by utilizing the search function of the radar in conjunction with a plan position indicator display. By sweeping the search radar across an arc including a small area on either side of the runway which the aircraft is approaching a scope presentation is obtained wherein the runway appears as a dark stripe in the center of the presentation with the turf on either side appearing as a bright background. This striking display affords an easily observed, valuable navigational indication for the pilot to follow. At somewhat higher altitudes, azimuth information is obtained from racon pulses which appear on the plan position indicator scope as a result of the highly directional transmitted beacon pulse. The display which occurs on a "B" type indicator at the higher altitudes is illustrated in Figure 5.

Obviously many modifications and variations of the present invention are possible in the light of the above teachings. It is therefore to be understood that within the scope of the appended claims the invention may be practiced otherwise than as specifically described.

What is claimed is:

1. An airborne controlled approach landing system comprising a first airborne radar device, a second airborne radar device, an airborne radar indicator coupled to said first and second radar devices, a radar beacon located at one end of an aircraft runway and being capable of transmitting electromagnetic pulses in response to interrogating pulses of the airborne radar, means including said first and said second radar devices for producing video pulses on the radar indicator respectively representing altitude and range, means for producing calibration markers on the radar indicator with which said video pulses can be compared to estimate range and altitude and means for producing a video pulse which moves along the face of the radar indicator at a rate indicating a preselected closing rate.

2. An airborne controlled approach landing system for aircraft comprising a first airborne radar device, a second airborne radar device, an airborne radar indicator coupled to said first and said second radar devices, means including said first radar device for producing a first video pulse on said indicator at a time delayed from each of said transmitted pulses by an amount proportional to the actual altitude of the aircraft above the ground at the instant of the specific pulse, means including said second radar device for producing a second video pulse on said indicator at a time delayed from each of said transmitted pulses by an amount proportional to the slant range of the aircraft to a preselected point on the ground at the instant of the specific pulse and means for producing a third video pulse which moves across the face of the indicator at a rate representing a preselected closing rate.

3. An airborne controlled approach landing system for aircraft comprising a first airborne radar device, a second airborne radar device, an airborne radar indicator coupled to said first and said second radar devices, means including said first radar device for producing a first video pulse on said indicator at a time delayed from each of said transmitted pulses by an amount proportional to the actual altitude of the aircraft above the ground at the instant of the specific pulse, means including said second radar device for producing a second video pulse on said indicator at a time delayed from each of said transmitted pulses by an amount proportional to the slant range of the aircraft to a preselected point on the ground at the instant of the specific pulse, means for producing a third video pulse which moves across the face of the indicator at a rate representing a preselected closing rate, and means for producing video pulses dividing the indicator presentation into a number of delineated areas each representing a predetermined magnitude of range and altitude.

4. A navigational aid for aircraft comprising circuitry for producing a first visual pulse on an indicator, said indicator having a reference point, means for causing said pulse to move from a remote point on the indicator toward said reference point at a preselected rate representing the optimum closing rate on glidepath for the specific aircraft and means for producing a second visual pulse on said indicator which moves along a common path with said first visual pulse at a rate representing the actual closing rate of the aircraft.

5. A navigational aid for aircraft comprising circuitry for producing a first visual pulse on an indicator, said indicator having a reference point, means for causing said pulse to move from a remote point on the indicator toward said reference point at a preselected rate representing the optimum closing rate on glidepath for the specific aircraft, means for producing a second visual pulse on said indicator which moves along a common path with said first visual pulse at a rate representing the actual closing rate of the aircraft, and means for producing a third visual pulse on said indicator which represents at all times the actual altitude of the aircraft.

6. A navigational aid for aircraft comprising a radar indicator, means for producing a voltage proportional to aircraft altitude, means for utilizing said voltage to produce a time demodulated visual pulse on said indicator, means for producing a linearly decreasing biasing voltage, a reference point on said indicator, means utilizing said biasing voltage to produce a second visual pulse moving from a remote point on said indicator toward said reference point at a rate determined by the rate of change of the bias voltage, means for producing a third visual pulse indicating with respect to said reference the distance of the aircraft from a preselected landmark and the rate at which the aircraft is approaching the landmark, said second visual pulse denoting the optimum closing rate on glidepath for comparison with actual closing rate shown by said third visual pulse and means for producing visible markers for graduating the display on the indicator into units of space so that range, altitude and closing rate may be directly noted from the indicator display.

7. A landing approach aid for aircraft comprising electronic means for determining altitude, a radar indicator having a reference point, means utilizing the output of said electronic means for producing on said indicator a visible pulse indicating altitude on a predetermined scale with respect to said reference point, further electronic means for determining the slant range of the aircraft with respect to an end of a runway, means for converting the output of said further electronic means into a visible representation of slant range on said indicator and other electronic means for producing on said indicator a visible representation of optimum closing rate for comparison with actual closing rate indicated by the range indication.

8. A landing approach aid for aircraft comprising means for providing on an indicator a visible indication of the location of an end of an aircraft runway in azimuth with respect to the aircraft, means for providing on the same indicator a visible presentation of the slant range of the aircraft from the end of said runway and the rate at which the aircraft is approaching said end, means for imposing on the same indicator a visible representation of an optimum closing rate for comparison with the actual rate of approach and means for also presenting on said indicator a visible representation of the altitude of the aircraft and the rate of descent of the aircraft.

9. In an airborne controlled approach landing system for providing information by which an instrument landing approach may be effected without visual reference to the ground, an airborne radar receiver and transmitter and a ground station radar beacon, a radar indicator screen, an electronic altitude computer, an altitude computer amplifier comprising a twin-triode with cathode resistor connected to operate as a single triode and having in its plate circuit a voltage divider network terminating at a negative direct current potential so that the output may be taken at a negative direct current level, an altitude differential amplifier connected to said computer amplifier and comprising a cathode degenerative pentode, a pulse generator triggered by said altitude differential amplifier for providing an altitude pulse appearing on the radar screen, a closing rate differential amplifier comprising a cathode degenerative pentode in normally cut-off condition, a closing rate computer comprising a high gain amplifier with inverse feedback controlling the discharge of a capacitor in a resistance-capacitance circuit to thereby provide a linearly decreasing cathode bias to said closing rate differential amplifier, a grid bias voltage on said closing rate differential amplifier proportional to the distance of the aircraft from the landing strip, a linearly decreasing grid bias voltage on said closing rate differential amplifier, a pulse generator controlled by said closing rate differential amplifier to provide a closing rate marker to appear on the radar screen and a rate and altitude marker geenrator comprising an inductance-capacitance tank in the cathode circuit of a normally conducting vacuum tube which is cut off by a negative gate voltage beginning at a time coincident with an airborne radar interrogating pulse thereby causing sine wave oscillations in said tank circuit which oscillations are clipped and peaked in succeeding stages to provide markers representing units of range and altitude on the radar screen.

References Cited in the file of this patent
UNITED STATES PATENTS

| | | |
|---|---|---|
| 2,475,212 | Wolff | July 5, 1949 |
| 2,516,356 | Tull | July 25, 1950 |
| 2,517,540 | Busignies | Aug. 8, 1950 |
| 2,584,034 | Lee | Jan. 29, 1952 |
| 2,585,855 | Sherwin | Feb. 12, 1952 |
| 2,685,687 | Falk | Aug. 3, 1954 |